United States Patent [19]

Ainsworth

[11] 4,390,990
[45] Jun. 28, 1983

[54] METHOD FOR MULTIPLE SIGNAL COLLISION DETECTION ON A TRANSMISSION LINE

[75] Inventor: Gerald L. Ainsworth, Palo Alto, Calif.

[73] Assignee: Hewlett-Packard Company, Palo Alto, Calif.

[21] Appl. No.: 184,855

[22] Filed: Sep. 8, 1980

[51] Int. Cl.³ .............................................. H04Q 9/00
[52] U.S. Cl. .................................. 371/57; 178/69 G; 340/825.5
[58] Field of Search ..................... 371/57, 52; 375/58; 178/69 G; 328/147, 158, 163; 340/147 LP, 147 R

[56] References Cited

U.S. PATENT DOCUMENTS

| | | | |
|---|---|---|---|
| 3,160,852 | 12/1964 | Simms, Jr. | 371/52 |
| 3,541,348 | 11/1970 | Abramson | 371/52 |
| 3,610,842 | 10/1971 | Formenti | 371/57 |
| 3,832,703 | 8/1974 | Lenert et al. | 178/69 G |
| 3,898,616 | 8/1975 | Baugh et al. | 371/52 |
| 3,940,571 | 2/1976 | Ashley | 371/57 |
| 4,271,523 | 6/1981 | Gable | 371/57 |

FOREIGN PATENT DOCUMENTS 1314180  4/1973  United Kingdom .

*Primary Examiner*—Charles E. Atkinson
*Attorney, Agent, or Firm*—Edward Y. Wong; Jeffery B. Fromm

[57] ABSTRACT

By coincidentally injecting a predetermined level of direct current with the transmission of data on a transmission line, multiple signal transmissions on the line can be detected by the presence of a DC level greater than a predetermined level on the line. Once detected, tactics for avoiding multiple signal collision problems can be implemented.

2 Claims, 2 Drawing Figures

METHOD FOR MULTIPLE SIGNAL COLLISION DETECTION ON A TRANSMISSION LINE

BACKGROUND AND SUMMARY OF THE INVENTION

Because of the skin-effect losses in a long transmission line, high-rate data transmission is markedly attenuated after traveling along a long line. Consequently, when two transmitters are attempting to communicate with each other on a transmission line when they are at a substantial distance apart, they would encounter great difficulty because of the attenuation. Further, should the two transmitters broadcast simultaneously, data collision occurs; that is, the high rate data being transmitted by each of the transmitters at either end of the transmission line interferes with the other to produce a nearly unintelligible transmission, or gibberish. In the prior art, neither receiving end would be aware that such a collision of data is taking place. This problem is further compounded with the simultaneous broadcasting by several transmitters; the data collision would be correspondingly more severe.

Since direct current (DC) in a transmission line is attenuated the least, the method in accordance with the present invention employs this fact to indicate the presence or absence of a transmission. DC drivers are switched on coincidentally with the beginning of any transmission and off at the end. Hence, with the presence or absence of a DC level, the receiving station, or node, on the transmission line can determine whether data transmission is being propagated along the line or not and can then react accordingly.

DETAILED DESCRIPTION OF THE INVENTION

Figure 1:
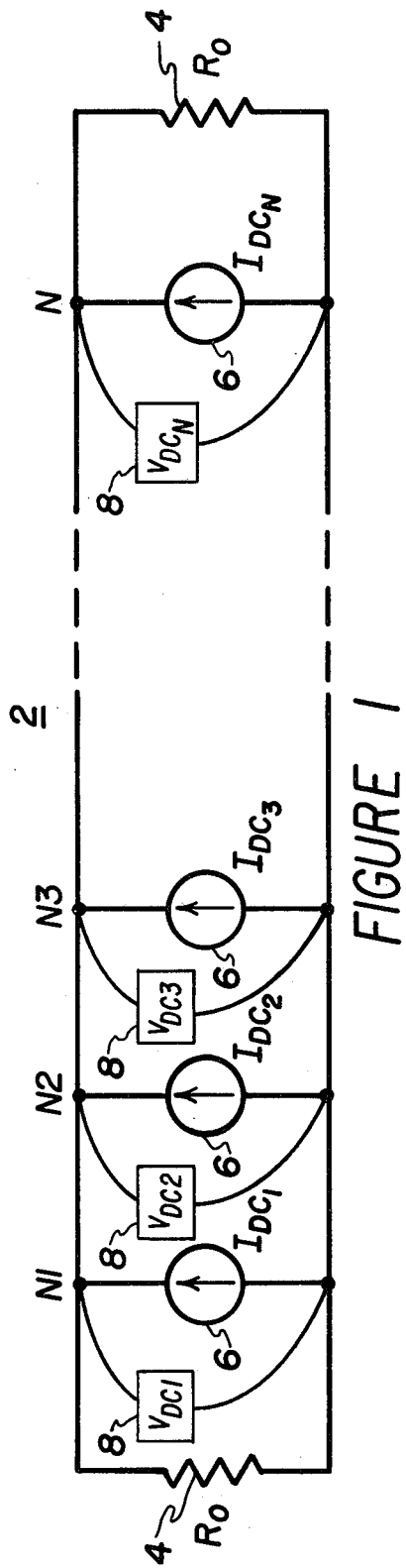
FIG. 1 shows the application of current sources or drivers at nodes along a transmission line in accordance with the present invention. The nodes represent a receiving and/or transmitting station.
Figure 2:
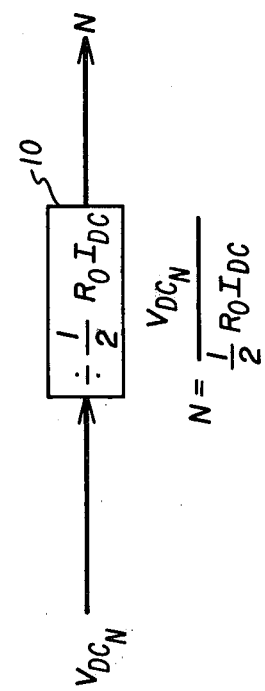
FIG. 2 shows a device for dividing by a predetermined factor the sensed DC level to indicate the number of active transmission stations for multiple signal collision detection.

In FIG. 1, a transmission line 2 terminated by a source impedance 4 is represented. Along transmission line 2 is a plurality of nodes N1, N2, ..., N, representating transmitting stations. Coincident to the beginning of a transmission, the active transmitting station N1, N2, ..., or N injects a predetermined level of current 6 into transmission line 2. Nodes N1, N2, ..., N, in addition to transmitting, may also be receiving, in which case the station is detecting a DC voltage level with a DC voltmeter 8. Hence, from FIG. 1, that no DC level is detected by voltmeter 8 indicates that there is no data transmission. Similarly, a DC level of $I_{DC}R_O/2$ indicates one transmission, and $NI_{DC}R_O/2$ indicates N transmissions. This is represented by FIG. 2, where the number of transmissions N occurring in the line is equal to the DC level measured at any receiving station divided by $I_{DC}R_O/2$. When there is a multiple data transmission occurring, a DC level level greater than $I_{DC}R_O/2$ will be detected. Then, the receiving station or stations can refrain from transmitting and contributing to a data collision until a later time if the received signal is unintelligible. Other corrective actions are also possible once detection of multiple signal collision on transmission line 2 is detected.

I claim:

1. A method for detecting multiple signal collisions on a transmission line at a receiving node comprising the step of:
   injecting a predetermined level of direct current (DC) at each active transmission node into said transmission line; and
   sensing at said receiving node the DC level resulting from said step of injecting a DC level at each active transmission node to indicate multiple signal collisions.

2. The method as in claim 1 further comprising the step of dividing by a predetermined factor the sensed DC level from said step of sensing to determine the number of active transmission nodes.

* * * * *